(12) United States Patent
Møller Larsen

(10) Patent No.: US 6,979,179 B2
(45) Date of Patent: Dec. 27, 2005

(54) WIND TURBINE ROTOR BLADE WITH COMBINED LIGHTING RECEPTOR AND DRAIN PASSAGE AND LIGHTING RECEPTOR WITH DRAIN PASSAGE

(75) Inventor: Flemming Møller Larsen, Christiansfeld (DK)

(73) Assignee: LM Glasfiber A/S, Lunderskov (DK)

( * ) Notice: Subject to any disclaimer, the term of this patent is extended or adjusted under 35 U.S.C. 154(b) by 0 days.

(21) Appl. No.: 10/450,273

(22) PCT Filed: Dec. 11, 2001

(86) PCT No.: PCT/DK01/00817

§ 371 (c)(1),
(2), (4) Date: Jun. 11, 2003

(87) PCT Pub. No.: WO02/48546

PCT Pub. Date: Jun. 20, 2002

(65) Prior Publication Data

US 2004/0028528 A1    Feb. 12, 2004

(30) Foreign Application Priority Data

Dec. 13, 2000  (DK) .............................. 2000 01868

(51) Int. Cl.$^7$ .............................................. B63H 1/26
(52) U.S. Cl. ........................... 416/223 R; 416/231 R; 415/4.3; 415/4.5
(58) Field of Search .................. 416/146 R, 223 R, 416/231 R, 233; 415/4.3, 4.5, 908; 290/44, 290/55

(56) References Cited

U.S. PATENT DOCUMENTS

| 1,968,072 A | * | 7/1934 | Creighton ................... 362/101 |
| 5,207,499 A | * | 5/1993 | Vajda et al. .................. 362/96 |
| 6,612,810 B1 | * | 9/2003 | Olsen et al. .................. 416/95 |

FOREIGN PATENT DOCUMENTS

| WO | WO 96/07825 | 3/1996 |
| WO | WO 00/14405 | 3/2000 |
| WO | WO 00/79128 A1 | 12/2000 |

OTHER PUBLICATIONS

International Search Report corresponding to PCT Application WO 02/48546 A1 dated Mar. 12, 2002.

* cited by examiner

*Primary Examiner*—Hoang Nguyen
(74) *Attorney, Agent, or Firm*—Brinks Hofer Gilson & Lione

(57) ABSTRACT

The invention relates to a wind turbine rotor blade which in its tip (1) is provided with a lightning receptor (2) and a drain passage (6; 16; 26; 36; 46; 56) connecting the blade interior (11, 12) with the blade exterior, the drain passage (6; 16; 26; 36; 46; 56) and the lightning receptor (2) having a common interface. The invention further relates to a lightning receptor provided with a drain passage (6; 36; 46; 56).

15 Claims, 2 Drawing Sheets

WIND TURBINE ROTOR BLADE WITH COMBINED LIGHTING RECEPTOR AND DRAIN PASSAGE AND LIGHTING RECEPTOR WITH DRAIN PASSAGE

TECHNICAL FIELD

The invention relates to a wind turbine rotor blade, which in its tip is provided with a lightning receptor and a drain passage connecting the exterior of the blade with the interior thereof. Furthermore the invention relates to a lightning receptor.

BACKGROUND ART

It is known to provide wind turbine rotor blades with lightning protection systems to protect them from strokes of lightning. As an example WO 96/07825 discloses a lightning protection arrangement, in which the blade tip is provided with a so-called lightning receptor of an electrically conducting material. This lightning receptor may capture a stroke of lightning and conduct the current through a lightning downconductor extending in the longitudinal direction of the blade and being earthed via the wind turbine hub. This system has proved to provide a particularly effective protection.

It is furthermore known to drill a drain bore in the tip of the wind turbine blade to drain off water, which has accumulated in the interior of the wind turbine blade in particular due to condensation.

Experience has shown that lightning may strike at such a drain bore, as this contains water. The lightning current heats the water and thus creates "steam explosions" resulting in such severe increases of the pressure that the blade is damaged. Lightning may strike in these drain bores even if the blade is provided with a lightning receptor. Due to the electric conductivity of the water in the drain bore, a spark may also fly between the lightning receptor and the drain bore. An effective drainage of the water accumulated in the interior of the blade is, however, necessary, the water otherwise accumulating in the cracks and pores of the blade material and drawing lighting thereto. Finally it should be noted that the accumulation of water in the interior of the blade is undesirable in view of corrosion and as a large amount of water will act as a displaceable ballast and interfere with the rotation of the blades.

DESCRIPTION OF THE INVENTION

The object of the invention is to provide a new and improved lightning protection of wind turbine rotor blades.

According to the invention the object is obtained by providing the drain passage and the lightning receptor with a common interface. As a result the water accumulated in the interior of the blade may be effectively drained to the exterior of the blade at a very small risk of causing steam explosions, the lightning current being conducted away by the lightning receptor without intense heating of the water.

The drain passage may be a bore provided in the blade wall, the cross section of said bore exceeding that of the lightning receptor inserted through the bore. This solution is advantageous in that it can be used in connection with conventional lightning receptors.

According to the invention the drain passage may be provided in form of one or more recesses in the bore wall of a bore provided in the blade wall, a lightning receptor being inserted through the said bore. This is particularly simple and inexpensive solution.

According to the invention the drain passage may form part of the lightning receptor, whereby a particularly simple and reliable embodiment is obtained in that special embodiments of the bore in the blade wall thus being render superfluous.

According to a preferred embodiment the lightning receptor is a cylindrical metal rod and the drain passage is a central longitudinal bore extending from the outermost end of the lightning receptor and communicating with transverse openings extending from the longitudinal bore to a surface area of the metal rod situated in the interior of the blade in the mounted state of the lightning receptor. This is a particularly reliable embodiment in that it allows steam to escape easily, whereby the risk of explosive pressure increases is minimised. In a similar manner the drain passage is exclusively defined by the material of the lightning receptor, whereby the blade material is not subjected to an increase of pressure.

Optionally the drain passage may be provided in the form of one or more recesses in the surface of the lightning receptor, whereby a particularly simple and inexpensive embodiment is obtained.

BRIEF DESCRIPTION OF THE DRAWINGS

The invention is explained in greater detail below by means of embodiments illustrated in the drawings, in which.

BEST MODES FOR CARRYING OUT THE INVENTION

Figure 1:
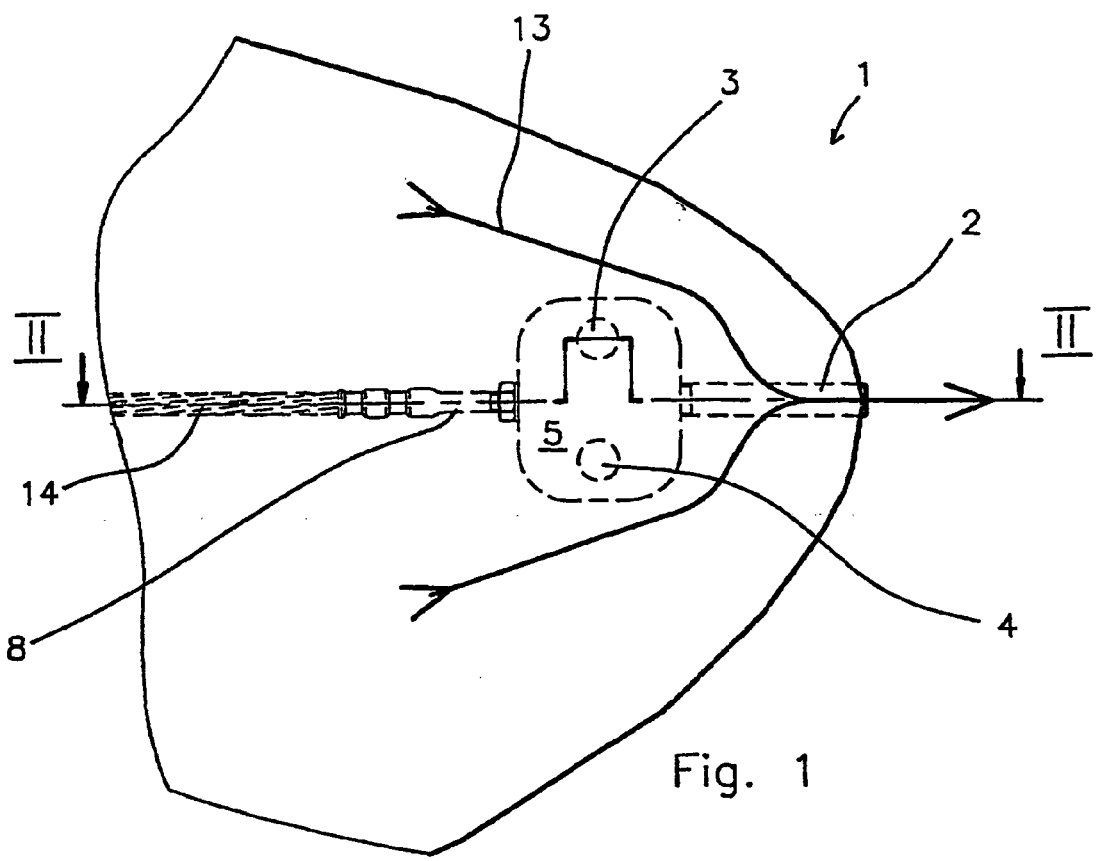
FIG. 1 is a diagrammatic view of a portion of the blade tip of a wind turbine rotor blade a first embodiment of the invention.

FIG. 1 is diagrammatic view of a blade tip according to a first embodiment of the invention seen from one side of the blade. A lightning downconductor in form of a copper cable 14 is screwed onto an anchoring block 5 by means of a terminal means 8. By means of threaded connections three lightning receptors 2, 3, 4, eg of wolfram, are secured to the anchoring block 5 made of a conductive material, such as stainless steel, red brass or red bronze, said lightning receptors extending from the anchoring block 5 to the free end of the blade tip 1, the pressure side of the blade tip and the suction side of the blade tip, respectively. In the embodiment shown in FIGS. 1, 2 and 4 a drain passage 6 is provided in the lightning receptor 2 extending from the anchoring block 5 to the free of the blade tip. The arrows 13 in FIG. 1 indicate how water from the interior of the blade may be drained to the exterior of the blade through the drain passage 6 in the lightning receptor 2.

The blade tip used to be filled with glue/resin/moulding material to a point beneath the anchoring block where a drain bore was provided in the blade wall. However, this method is problematic in that the glue/resin/moulding material shrinks on solidification and form cracks and pores in which water may accumulate.

Figure 2:
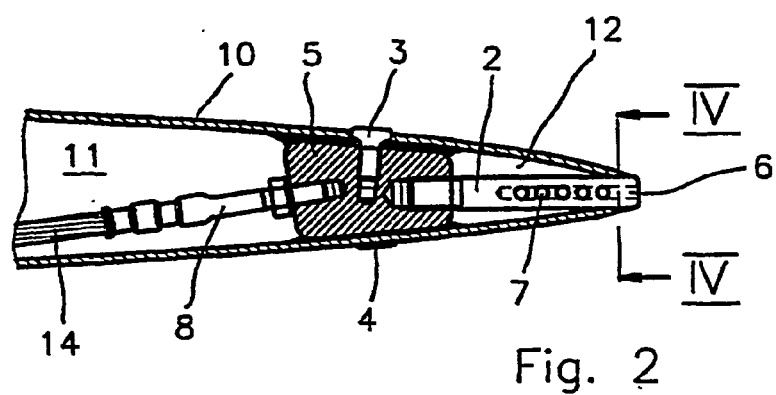
FIG. 2 is a sectional view along the line II—III in FIG. 1.

FIG. 2 illustrates the first embodiment, in which the drain passage is formed of a longitudinal bore 6 in the lightning receptor 2 which has the shape of a circular wolfram rod. The longitudinal bore 6 opens into the distal end of the lightning receptor 2 on the outer face of the blade and communicates with the inner cavity 11, 12 of the blade through openings 7 in the lightning receptor 2. The areas of the interior 11, 12 of the blade on either side of the anchoring block 5 communicate with each other on both sides of the anchoring block 5 so as to allow water to flow from the area 11 to the area 12 and out of the blade through the drain passage 6.

Figure 3:
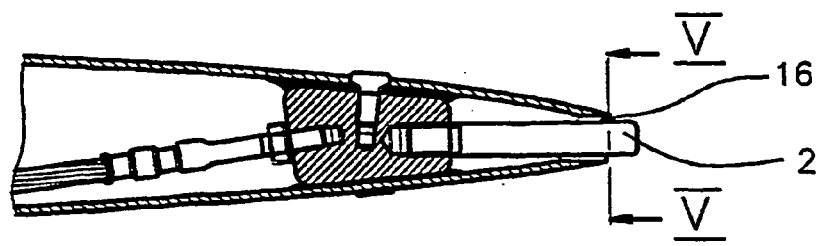
FIG. 3 illustrates a second embodiment of the invention shown in the same manner as the embodiment shown in FIG. 2.

The blade tip shown in FIG. 3 is a second embodiment of the invention. In this embodiment the lightning receptor 2 is a solid circular rod inserted through a drain bore 16 having a slightly larger diameter than the diameter of the rod. As a result a gap is created between the wall of the bore 16 and the surface of the receptor 2 through which water may escape to the exterior of the blade. This embodiment may be used in connection with conventional lightning receptors.

Figure 4:
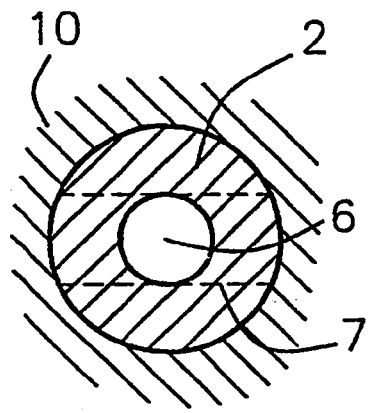
FIG. 4 is a sectional view along the line IV—IV in FIG. 2.
Figure 5:
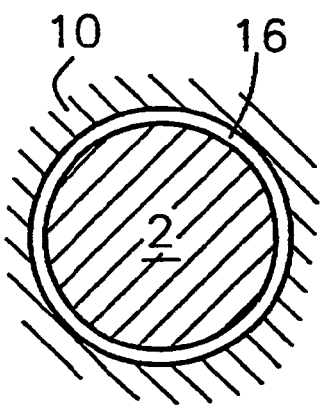
FIG. 5 is a sectional view along the line V—V in FIG. 3.

FIGS. 5–9 are sectional views through the blade wall and the lightning receptor 2. FIGS. 4 and 5 are thus sectional views through the embodiments shown in FIGS. 2 and 3, respectively.

Figure 6:
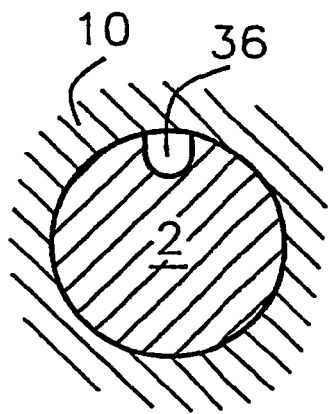
FIGS. 6–9 illustrates optional embodiments of the invention shown in the same manner as the embodiments shown in FIGS. 4 and 5.
Figure 7:
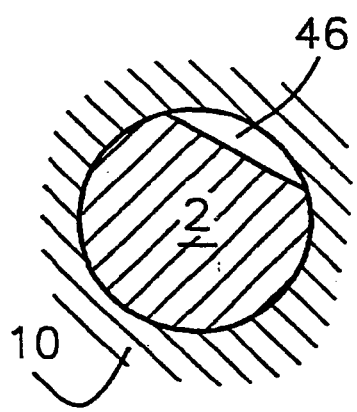

FIG. 6 shows an embodiment in which the drain passage is formed as a groove 36 in the surface of the lightning receptor 2. In the embodiment shown in FIG. 7 the cross section of the drain passage 46 is formed as a section of the circular cross section of the lightning receptor 2.

Figure 8:
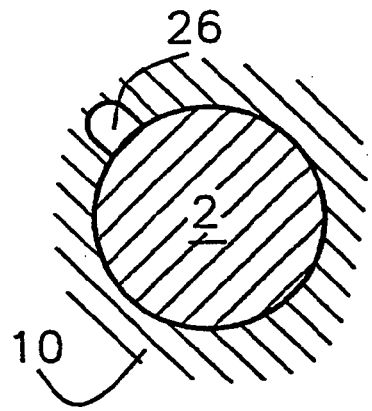

FIG. 8 illustrates an embodiment in which the drain passage is a recess 26 in the wall of a circular bore through which the lightning receptor 2 has been inserted.

Figure 9:
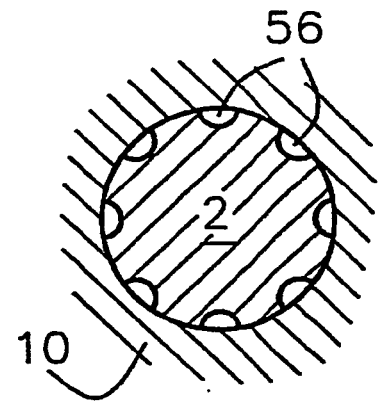

FIG. 9 shows an embodiment in which the drain passage is formed of several longitudinal grooves 56 in the surface of the lightning receptor 2.

The invention is not restricted to the above embodiments.

The shown lightning receptors 2 are formed as circular rods of a diameter of about 15 mm. The embodiment shown in FIGS. 2 and 4 is provided with a drain passage of a diameter of about 6 mm. The lightning receptor and the drain passage may, however, have shapes and dimensions deviating from those shown.

The invention may be used both in connection with stall-controlled blades comprising a brake tip which is rotatable relative to the rest of the blade, and in connection with pitch-controlled blades.

What claimed is:

1. Wind turbine rotor blade comprising a blade wall which separates a blade interior from a blade exterior, said blade interior comprising a cavity, which blade in its tip is provided with a lightning receptor and a drain passage connecting the blade interior with the blade exterior, such that water accumulated in the interior of the blade be drained to the exterior of the blade via the drain passage, characterised in that the drain passage and the lightning receptor have a common interface.

2. Wind turbine rotor blade according to claim 1, characterised in that the drain passage is a bore provided in the blade wall, the cross section of said bore exceeding that of the lightning receptor inserted through the bore.

3. Wind turbine rotor blade according to claim 1, characterised in that the drain passage is formed of one or more recesses in the bore wall of a bore provided in the blade wall, the lightning receptor being inserted through the bore.

4. Wind turbine rotor blade according to claim 1, characterised in that the drain passage is provided in the lightning receptor.

5. Lightning receptor to be arranged in the tip of wind turbine rotor blade, characterised in that the lightning receptor is provided with a drain passage and that the lightning receptor is a cylindrical metal rod and that the drain passage is a central longitudinal bore extending from the outermost end of the lightning receptor and communicating with transverse openings extending from the longitudinal bore to a surface area of the metal rod, said surface being in the interior of the blade in the mounted state of the lightning receptor.

6. Wind turbine rotor blade according to claim 1, wherein the drain passage is formed as one or more recesses in the surface of the lightning receptor.

7. Wind turbine rotor blade according to claim 1, wherein the drain passage is formed as a groove in the surface of the lightning receptor.

8. Wind turbine rotor blade according to claim 1, wherein the drain passage is formed as a plurality of grooves in the surface of the lightning receptor.

9. Wind turbine rotor blade according to claim 1, wherein the lightning receptor has a circular cross section.

10. Wind turbine rotor blade according to claim 9, wherein the drain passage is formed as a section of the circular cross section of the lightning receptor.

11. Wind turbine rotor blade according to claim 4, wherein the drain passage is formed as a bore in the lightning receptor.

12. Wind turbine rotor blade according to claim 11, wherein the drain passage further comprises transverse openings in communication with the interior of the blade.

13. Wind turbine rotor blade according to claim 9, wherein the lightning receptor has a diameter of about 15 mm.

14. Wind turbine rotor blade according to claim 11, wherein the bore has a circular cross section.

15. Wind turbine rotor blade according to claim 14, wherein the bore has a diameter of about 6 mm.

* * * * *